United States Patent
Andhare et al.

(10) Patent No.: US 7,672,295 B1
(45) Date of Patent: Mar. 2, 2010

(54) METHOD AND SYSTEM FOR DESIGN FOR RUN-TIME CONTROL OF VOICE XML APPLICATIONS

(75) Inventors: Shirish Andhare, Sunnyvale, CA (US);
Erik Haakenson, San Jose, CA (US);
Ramy Adeeb, San Francisco, CA (US);
Beth McKinnon, San Carlos, CA (US);
Matt Vernooy, Cupertino, CA (US); Jeff Kunins, Seattle, WA (US)

(73) Assignee: TellMe Networks, Inc., Mountain View, CA (US)

(*) Notice: Subject to any disclaimer, the term of this patent is extended or adjusted under 35 U.S.C. 154(b) by 658 days.

(21) Appl. No.: 10/988,408

(22) Filed: Nov. 12, 2004

Related U.S. Application Data

(60) Provisional application No. 60/519,817, filed on Nov. 12, 2003.

(51) Int. Cl.
*H04L 12/66* (2006.01)
(52) U.S. Cl. ............. 370/352; 379/88.04; 379/88.17; 379/266.07
(58) Field of Classification Search .............. 704/270.1; 379/266.07, 88.04, 88.17; 370/493, 352
See application file for complete search history.

(56) References Cited

U.S. PATENT DOCUMENTS

| | | | | |
|---|---|---|---|---|
| 6,173,266 | B1 * | 1/2001 | Marx et al. | 704/270 |
| 6,952,800 | B1 * | 10/2005 | Danner et al. | 715/234 |
| 7,492,873 | B2 * | 2/2009 | Giroti et al. | 379/88.17 |
| 2002/0165988 | A1 * | 11/2002 | Khan et al. | 709/246 |
| 2005/0027536 | A1 * | 2/2005 | Matos et al. | 704/270.1 |

OTHER PUBLICATIONS

"Configuring WebLogic Servers and Clusters", BEA Systems, 2001.*

* cited by examiner

*Primary Examiner*—Curtis Kuntz
*Assistant Examiner*—Yosef K Laekemariam
(74) *Attorney, Agent, or Firm*—Perkins Coie LLP

(57) ABSTRACT

A method and system for implementing run-time control over voice application behavior. The method includes identifying a plurality of control point locations within a given voice application and a plurality of corresponding required responses to the control points. A design-for-control methodology is used to instrument the control points of voice application. A control agent is configured with web-based controls to manage the control points. The control points are used to alter the voice application's behavior during run-time.

19 Claims, 4 Drawing Sheets

METHOD AND SYSTEM FOR DESIGN FOR RUN-TIME CONTROL OF VOICE XML APPLICATIONS

CROSS REFERENCE TO RELATED APPLICATIONS

This case is related to, and claims priority to, commonly assigned U.S. Provisional Patent Application "DESIGN FOR CONTROL OF VOICE XML APPLICATIONS", by Andhare, et al., Ser. No. 60/519,817, filed on Nov. 12, 2003, which is incorporated herein in its entirety.

TECHNICAL FIELD

The present invention relates generally to voice applications.

BACKGROUND ART

Many different types of voice-enabled applications are being developed using the VoiceXML standard and associated Internet technologies. VoiceXML is a markup language for creating voice user interfaces. It uses speech recognition and/or touchtone (e.g., DTMF keypad) for input, and pre-recorded audio and text-to-speech synthesis (TTS) for output. Callers interact with VoiceXML applications via a VoiceXML "interpreter" (also known as a "browser") running on a telephony server in an analogous way to Web surfers interacting with HTML applications via graphical browsers on their PCs.

VoiceXML based applications are growing in popularity and effectiveness. This growth is reflected in the many recently deployed Voice XML based business and service applications. For example, many phone companies implement toll-free directory assistance services that handle over 200,000,000 calls per year. Such services often let customers speak a name or phone number to make a phone call and use voice commands to, for example, access information services such as stock quotes and sports. Other XML based services provide customers a voice-enabled portal that handles thousands of calls each day and are capable of retrieving the customer's records, running a line test, checking and confirming appointment times, updating customer contact information, and the like. Thousands of companies in a wide array of industries offer speech applications that meet the varied needs of their customers and employees.

In the prior art, run-time control over voice application behavior is very problematic. Run-time control over voice application behavior is needed in order to adapt an application to rapidly manage operational contingencies or take advantage of a business opportunity (e.g. change main greeting prompts, modify transfer destinations, modify call tiering logic, etc.). In the prior art this typically requires a full development cycle. Such development cycles include time-consuming and labor-intensive tasks such as recoding software, software quality assurance and testing, and application software re-deployment requiring service downtime. Further, these changes must be made by technical personnel who are often not accountable for caller experience making this process error-prone. Several iterations of changes before acceptance are not uncommon. Thus, what is required is an efficient voice application updating mechanism that enables enterprises to easily and rapidly adapt their critical phone self-service applications to changing business and operational conditions at run-time with minimum errors and zero downtime

DISCLOSURE OF THE INVENTION

Embodiments of the present invention provide an efficient run-time voice application updating mechanism that enables enterprises to easily and rapidly adapt voice applications to changing business and operational conditions.

In one embodiment, the present invention is implemented as a method for implementing run-time control over voice application behavior. The method includes identifying a plurality of control point locations within a given voice application and a plurality of corresponding required responses to the control points. A design-for-control methodology is used to instrument the control points for the voice application. A control agent (e.g., control Extranet) is configured with web-based controls to manage the control points. The control points are used to dynamically alter the voice application's behavior at run-time. In this manner, run-time behavior modification via the control points enables an enterprise to efficiently and rapidly adapt voice applications to, for example, changing business and operational conditions. For example, one application would be selectively enabling a message that informs callers of a storm in the mid-west and its impact on air traffic schedules in the area.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "translating," "generating," "determining," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices.

Computer System Environment

Figure 1:
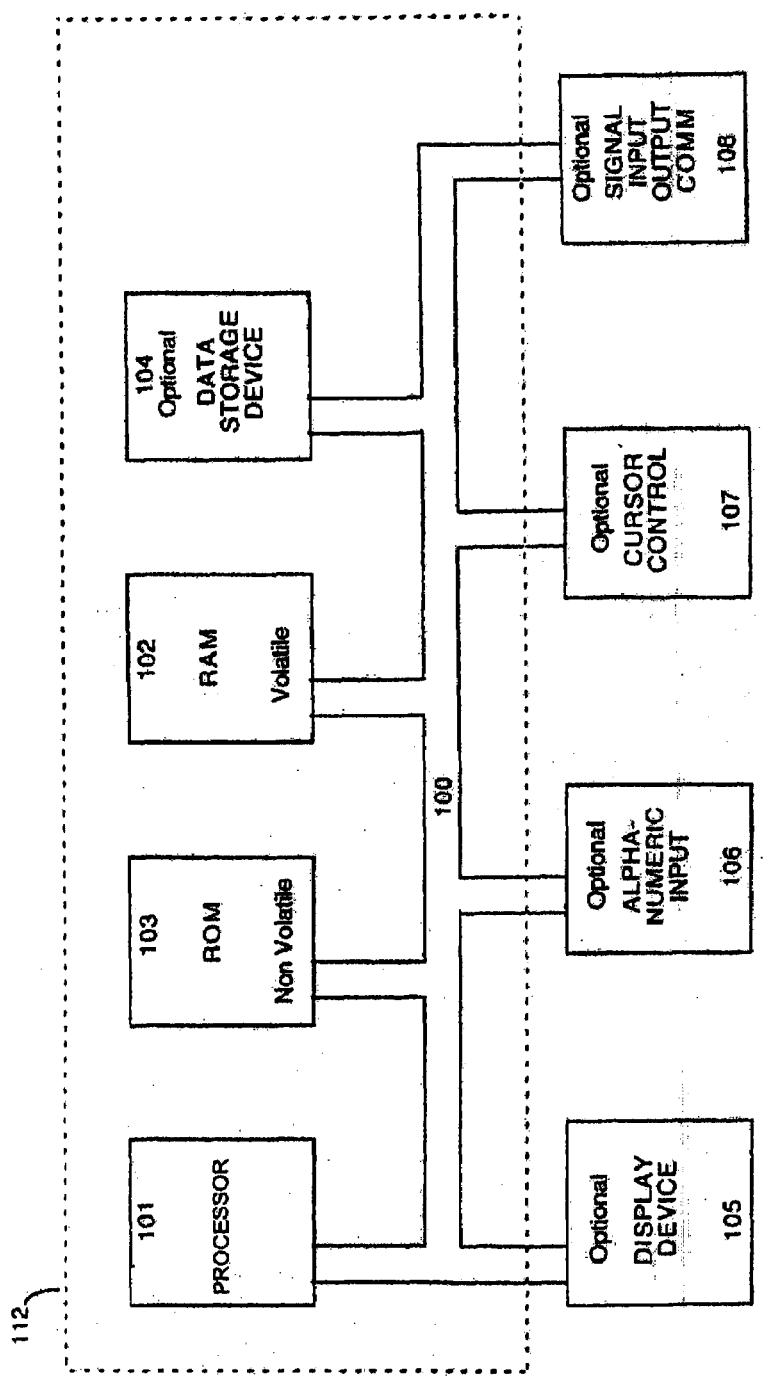
FIG. 1 shows the components of a basic computer system that provides the environment for certain computer implemented functions of the present invention.

Referring to FIG. 1, a computer system 112 is illustrated. The computer system 112 can be used to implement a server computer system, client computer system, or the like. Within the following discussions of the present invention, certain processes and steps are discussed that are realized, in one embodiment, as a series of instructions (e.g., software program) that reside within computer readable memory units of system 112 and executed by processors of system 112. When executed, the instructions cause computer system 112 to perform specific actions and exhibit specific behavior which is described in detail to follow.

Specific aspects of the present invention are operable within a programmed computer system. A computer system 112 operable to implement the elements of the present invention is shown in FIG. 1. In general, the computer system 112 of the present invention includes an address/data bus 100 for communicating information, one or more central processor(s) 101 coupled with bus 100 for processing information and instructions, a computer readable volatile memory unit 102 (e.g., random access memory, static RAM, dynamic RAM, etc.) coupled with bus 100 for storing information and instructions for the central processor(s) 101, a computer readable non-volatile memory unit 103 (e.g., read only memory, programmable ROM, flash memory, EPROM, EEPROM, etc.) coupled with bus 100 for storing static information and instructions for processor(s) 101. System 112 can optionally include a mass storage computer readable data storage device 104, such as a magnetic or optical disk and disk drive coupled with bus 100 for storing information and instructions. Optionally, system 112 can also include a display device 105 coupled to bus 100 for displaying information to the computer user, an alphanumeric input device 106 including alphanumeric and function keys coupled to bus 100 for communicating information and command selections to central processor(s) 101, a cursor control device 107 coupled to bus for communicating user input information and command selections to the central processor(s) 101, and a signal input/output device 108 coupled to the bus 100 for communicating messages, command selections, data, etc., to and from processor(s) 101.

Program instructions executed by the computer system can be stored in RAM 102, ROM 103, or the storage device 104 and, when executed in a group, can be referred to as logic blocks or procedures. The display device 105 of FIG. 1 utilized with the computer system 112 of the present invention may be a liquid crystal device, cathode ray tube, or other display device suitable for creating graphic images and alphanumeric characters recognizable to the user. The cursor control device 107 allows the computer user to signal dynamically the two dimensional movement of a visible pointer on a display screen of the display device 105. Many implementations of the cursor control device are known in the art including a trackball, mouse, joystick, or special keys on the alphanumeric input device 105 capable of signaling movement of a given direction or manner of displacement.

Embodiments of the Present Invention

Figure 2:
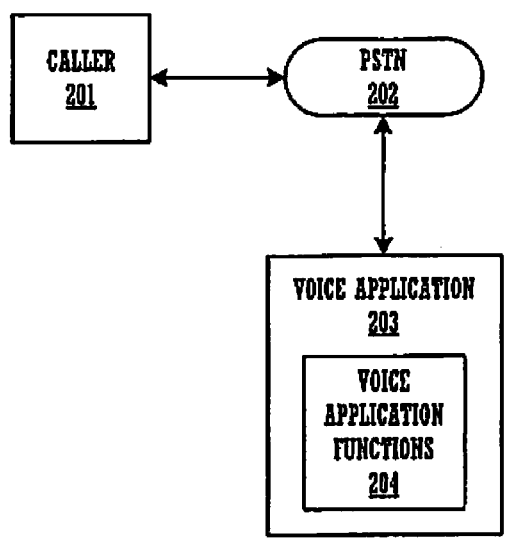
FIG. 2 shows a diagram of the voice application system in accordance with one embodiment of the present invention.

FIG. 2 shows a diagram of the voice application system 200 in accordance with one embodiment of the present invention. As depicted in FIG. 2, a caller 201 is illustrated interacting with a number of functions 204 of a voice application 203 via telephone network 202 (e.g., the Public Switched Telephone Network).

Embodiments of the present invention provide an efficient run-time voice application updating mechanism that enables enterprises to easily and rapidly adapt one or more functions 204 of a voice application 203 to, for example, changing business and operational conditions.

Embodiments of the present invention implement a design-for-change, or design-for-control, application model configured to provide an operational and design framework that makes it possible to affect the behavior of the voice application 203 in real-time (e.g., at run-time), with minimal errors, and without having to edit and re-deploy VoiceXML code. In the present embodiment, voice application 203 is a VoiceXML application and is designed with specific "built-in" operational control points that can be administered at run-time over an easy to use web-based interface. For example, one application of this methodology is in the area of traditional network prompter replacement allowing operational personnel to easily and immediately administer the behavior of a network prompter application.

The design-for-control application model in accordance with embodiments of the present invention is based on the fundamental assumption that even well designed VoiceXML applications need to be administered in real-time to handle operational contingencies and changing business needs. For example, in these scenarios it is impractical and error prone to physically edit and re-deploy VoiceXML applications. The design-for-change application model makes it possible to modify the behavior of an application (e.g., application 203) without modifying application code.

Figure 3:
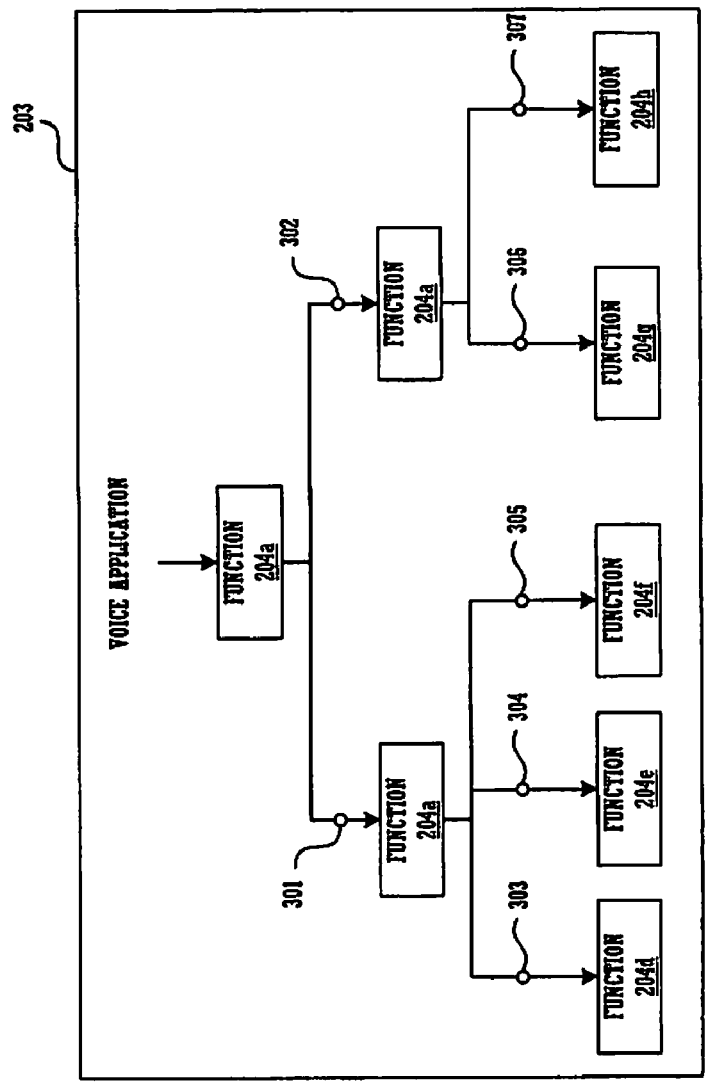
FIG. 3 shows a diagram depicting a plurality of functions of the voice application in accordance with one embodiment of the present invention.

FIG. 3 shows a diagram depicting a plurality of functions 204a-204h of the voice application 203 in accordance with one embodiment of the present invention. As shown in FIG. 3, a plurality of control points 301-307 are shown coupled to the functions 204a-204h. Through the course of operation, a caller (e.g., caller 201) accesses the voice application 203 and proceeds through a series of voice based choices to access one or more of the functions 204a-204h. The control points 301-

307 are operable to change the flow of a user through the various functions 204a-204h in accordance with their specific configuration/settings.

In accordance with embodiments of the present invention, at the core of the design-for-change application model of the present invention are three steps. First, typical operational changes are anticipated up front during the design of the voice application 203. While not all changes can be anticipated up front, typical operational changes can be foreseen by understanding the deployment environment and operational change (use case) scenarios for the application. Second, a plurality of control points (e.g., 301-307) are designed into the application 203. Once the control points have been identified, it is possible to create a set of application parameters that will effect the anticipated changes in behavior and to design the application for handling the changes to those application parameters. In one embodiment, the control points 301-307 are articulated using an extensible XML schema (e.g., described below). Third, the control points 301-307 are exposed over an easy to use user interface (e.g., described below). By isolating the application parameters and articulating them through a rich and extensible XML data model representing control points, it is possible to administer the control points 301-307 with an easy to use interface for effecting operational changes.

Figure 4:
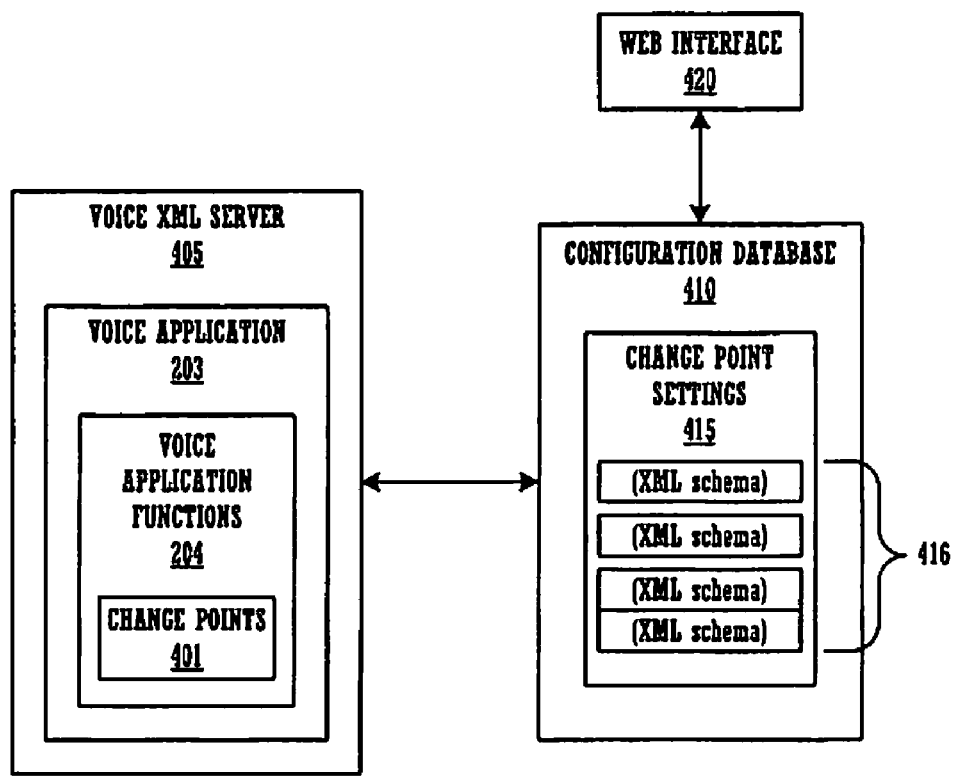
FIG. 4 shows a diagram depicting the voice application as hosted by a server coupled to a configuration database in accordance with one embodiment of the present invention.

FIG. 4 shows a diagram depicting the voice application 203 as hosted by a server 405 coupled to a configuration database 410 in accordance with one embodiment of the present invention.

In one embodiment, a VoiceXML application gets deployed in two components: 1) The VoiceXML application itself (e.g., voice application 203); and 2) An XML document representing the operational control parameters that will influence the behavior of the application (e.g., control point settings 415). The XML document 415 is modifiable over a web-based interface 420. In the present embodiment, in order to ensure that these changes are effected in real-time, the VoiceXML application 203 fetches the XML document 415 and loads values of various operational parameters from this file (e.g., XML schema objects 416) on a call-by-call basis.

As described above, an XML schema (e.g., control point settings 415 and XML schema objects 416) is used to articulate all the control points 401 associated with the VoiceXML application 203. This XML schema is designed to provide a clear definition of control point types allowing a VoiceXML application to modify its behavior based on the elements, their attributes, their values and their types contained in the XML document 415. The XML schema is designed to be extensible so that new control point types may be added easily to accommodate new and complex control points. Additionally, the XML schema is designed to be self-documenting such that a visual, administrative tool may generate a simple and user-friendly GUI interface 420 to manipulate the attribute values within the document. Furthermore, the XML schema is designed to be static so that once the XML document is rendered there is no further dependence on a specific dynamic application server for further qualifying or resolving the contents of the document.

Exemplary elements of the schema in accordance with one embodiment of the present invention are defined and structured as follows:

<control_points> representing a list of control points associated with an application
    <form> representing a collection of control points associated with a specific area of the application
        <group> representing a collection of operationally related control points
            <control_point> representing a single control point within the application Each element underneath the root <control_points> element contains a unique id and description. Each of these elements are described below.

The form element is structured as defined below.

<form id="form id", desc="form description">

</form> where "id" uniquely identifies form, "desc" is a verbose description of the form context within the application, and "group" is a group element contained in the form.

The group element contains a collection of control points that are operationally related to each other. Each form contains at least one group. A group must contain at least one control point. The group element is structured as shown below.

<group id="group id' desc="group description">

</group> where "id" uniquely identifies the group, "desc" is a verbose description of the group and is used for documentation and UI generation purposes, and "control_point" is the control_point element contained in the form (described below).

The "control_point" element defines each individual change point within an application. Control points have types associated with them, so that both the VoiceXML application and a UI generator that manipulates those control points may handle them appropriately.

<control_point id="control_point id" desc="control_point description" allow_change="true/false depending on whether changeable" type="type of control_point" . . . type specific attributes>

</control_point> where "id" uniquely identifies the change point, "type" is the data type of the element. Currently supported types include Boolean, text field, transfer, prompt, application (URL), enumeration (a range of pre-defined values e.g. days of the week), "attributes" are type specific attributes (described below), "desc" is a verbose description of the change point and is used for documentation and UI generation purposes, and "allow_change" is for whether exposed to the change interface or not.

Control point types are defined as simple and compound types. All simple types have a value attribute associated with them. The contents of the value attribute are type specific and may be a number, a string, enumeration, or a Boolean. Exemplary simple types and their attributes are defined as follows. "Boolean" is a value that can be true or false, "number" is an integer value.

Compound types have multiple attributes defined. For example, Prompt, Xfer, Enumeration, and Application are compound types. "Prompt" can be the URL of a .wav file or the tts content associated with the prompt, "Xfer" can be a number representing the actual digits to dial or the bridge Boolean representing whether to make a bridged or non-bridged transfer, "application" is the URL of the external application link to, and an Enumeration is a range of pre-defined values e.g. days of the week.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A method for control of a voice application, comprising:
   accessing the voice application that supports a function;
   identifying an anticipated operational change associated with the function based on an environment in which the voice application is deployed;
   defining a control point associated with the anticipated operational change;
   wherein the control point is associated with a plurality of corresponding responses;
   generating an XML document having a parameter associated with the control point;
   wherein, the parameter is used to effect the anticipated operational change associated with the function;
   wherein, the XML document is modifiable over a web-based interface;
   retrieving the XML document to load a value for the parameter in the XML document on a call-by-call basis;
   wherein, the voice application changes a behavior of the function in the voice application based on the value for the parameter in the XML document when the voice application is running thus effecting the change of the behavior without downtime of the voice application.

2. The method of claim 1,
   wherein, the voice application is a voice XML application; and
   wherein, the voice application executes on a voice XML server.

3. The method of claim 1, wherein the control point, comprises:
   a type indicator associated with a control point type of the control point;
   wherein, the type indicator comprises: a simple type and a compound type;
   a unique identifier of the control point; and
   an attribute field with a value that is specific to the control point type.

4. The method of claim 1, further comprising:
   changing the behavior of the function via the Web-based interface;
   wherein, the Web-based interface is generated from the XML document and the value of the attribute field point is modifiable via the Web-based interface.

5. The method of claim 1,
   wherein the voice application effects the change of the behavior of the function without having to edit and redeploy VoiceXML code for the voice application; and
   wherein, the behavior of the function is changed to adapt the voice application to changing business and operational conditions.

6. A system for control of a voice application, comprising:
   a processor;
   a memory coupled to the processor and having computer readable code which when executed by the processor causes the system to implement a method for run-time control of the voice application, comprising:
   generating a configuration document for controlling a plurality of control points within the voice application, each of the plurality of control points being associated with a plurality of corresponding responses;
   wherein the plurality of control points are associated with an anticipated set of operational changes associated with a set of functions of the voice application based on an environment in which the voice application is deployed;
   configuring the plurality of control points in accordance with the configuration document;
   retrieving the configuration document to change a behavior of the voice application when the voice application is running thus effecting the change of the behavior without downtime of the voice application.

7. The system of claim 6, wherein the voice application is a voice XML application.

8. The system of claim 6, wherein the configuration document is an XML document.

9. The system of claim 6, wherein the at least one of the plurality of control points is changed by using a Web interface; and wherein, the configuration document is self-documented such that the Web interface is generated from the self-documentation.

10. The system of claim 6, wherein the configuration document is accessed during run-time to receive respective XML schema settings to configure the plurality of control points.

11. The system of claim 6, wherein the configuration document is accessed via a configuration database.

12. A computer readable storage medium having stored therein instructions which when executed by a processor of a computer system causes the computer system to perform a method comprising:
   generating an XML document for configuring a control point in a voice application;
   wherein the control point is associated with a plurality of corresponding responses;
   wherein the control point is associated with an anticipated operational change associated with a function of the voice application based on an environment in which the voice application is deployed;
   configuring the control point in accordance with a parameter associated with the control point in the XML document;
   wherein the control point comprises:
      a type indicator
      an identifier of the control point; and
      an attribute field with a value that is specific to the control point type,
   retrieving the XML to configure the control point by loading a value for the parameter of the control point in the XML document;
   wherein, the voice application changes a behavior of the voice application based on the value of the parameter of the control point in the XML document when the voice application is running thus effecting the change of the behavior without downtime of the voice application;
   wherein, the behavior of the function is changed to adapt the voice application to changing business and operational conditions.

13. The computer readable storage medium of claim 12, wherein the voice application is a voice XML application.

14. The computer readable storage medium of claim 12, wherein the XML document is self-documented such that a Web interface is generated from the self-documentation.

15. The computer readable storage medium of claim 12, wherein the control point is changed by using a Web interface, wherein, the value of the attribute field of the control point is modifiable through the Web interface.

16. The computer readable storage medium of claim 12, wherein the XML document is accessed during run-time to receive respective XML schema settings for configuring the control point.

17. The computer readable storage medium of claim 12, wherein the XML document is accessed via a configuration database.

18. The computer readable storage medium of claim 12, wherein a type of the control point comprises, one or more of data types including, Boolean, text field, transfer, prompt, application (URL), and enumeration.

19. The computer readable storage medium of claim 12, wherein the control point further comprises, a description field to document description of the control point and for user interface generation purposes.

* * * * *